US012524706B2

(12) United States Patent
Akarapu et al.

(10) Patent No.: US 12,524,706 B2
(45) Date of Patent: Jan. 13, 2026

(54) OPTIMIZED IOT DATA PROCESSING FOR REAL-TIME DECISION SUPPORT SYSTEMS

(71) Applicant: Bank of America Corporation, Charlotte, NC (US)

(72) Inventors: Om Purushotham Akarapu, Hyderabad (IN); Daniel D. Widjanarko, San Francisco, CA (US); Durgadatta Belhekar, East Mumbai (IN); Jitendra Upadhyay, Bhopal (IN); Rama Krishnam Raju Rudraraju, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 95 days.

(21) Appl. No.: 18/379,770

(22) Filed: Oct. 13, 2023

(65) Prior Publication Data

US 2024/0037454 A1    Feb. 1, 2024

Related U.S. Application Data

(63) Continuation of application No. 16/424,633, filed on May 29, 2019, now Pat. No. 11,823,016.

(51) Int. Cl.
| | |
|---|---|
| *H04L 29/06* | (2006.01) |
| *G06F 16/903* | (2019.01) |
| *G06N 3/08* | (2023.01) |
| *G06N 20/00* | (2019.01) |

(52) U.S. Cl.
CPC ....... *G06N 20/00* (2019.01); *G06F 16/90335* (2019.01); *G06N 3/08* (2013.01)

(58) Field of Classification Search
CPC ..... G06N 20/00; G06N 3/08; G06F 16/90335

USPC .......................................................... 706/12
See application file for complete search history.

(56) References Cited

U.S. PATENT DOCUMENTS

| | | |
|---|---|---|
| 5,699,521 A | 12/1997 | Iizuka et al. |
| 6,233,393 B1 | 5/2001 | Yanagihara et al. |
| 7,020,701 B1 | 3/2006 | Gelvin et al. |
| 9,171,079 B2 | 10/2015 | Banka et al. |
| 9,225,793 B2 | 12/2015 | Dutta et al. |
| 9,806,974 B2 | 10/2017 | Subramanian et al. |
| 10,007,513 B2 | 6/2018 | Malladi et al. |
| 10,303,869 B1 | 5/2019 | Duke et al. |

(Continued)

OTHER PUBLICATIONS

Al-Fuqaha, "Internet of things: A survey on enabling technologies, protocols, and applications", 2015, IEEE, vol. 17, pp. 2347-2372 (Year: 2015).*

(Continued)

*Primary Examiner* — Taghi T Arani
*Assistant Examiner* — Gregory A Lane
(74) *Attorney, Agent, or Firm* — Banner & Witcoff, Ltd.

(57) ABSTRACT

Aspects of the disclosure relate to apparatuses, method steps, and systems for optimized Internet of Things (IoT) data processing for real-time decision support systems. The systems are used for real-time processing prioritization using a prioritization code and/or processing code. Edge devices may generate processing codes that are used in optimizing the data processing. For example, the system receives sensor data and preprocesses the sensor data with a simplified state estimation module to calculate a variance that is used to determine a processing code and/or a prioritization code.

20 Claims, 8 Drawing Sheets

(56) References Cited

U.S. PATENT DOCUMENTS

| | | |
|---|---|---|
| 2004/0217881 A1 | 11/2004 | Pedyash et al. |
| 2011/0137836 A1* | 6/2011 | Kuriyama ............ A61B 5/4809 |
| | | 706/12 |
| 2012/0271876 A1 | 10/2012 | Martch |
| 2014/0254466 A1 | 9/2014 | Wurster et al. |
| 2016/0144875 A1 | 5/2016 | Kim et al. |
| 2017/0139417 A1 | 5/2017 | Reiff et al. |
| 2017/0187625 A1 | 6/2017 | Nolan et al. |
| 2017/0188178 A1 | 6/2017 | Vrabete |
| 2017/0264511 A1 | 9/2017 | Myadam |
| 2018/0174057 A1* | 6/2018 | Citriniti ................. G06Q 10/04 |
| 2018/0261020 A1 | 9/2018 | Petousis et al. |
| 2019/0033845 A1* | 1/2019 | Cella ................... H04L 67/1097 |
| 2019/0130500 A1 | 5/2019 | Arandia et al. |
| 2019/0171208 A1 | 6/2019 | Magalhães de Matos |
| 2019/0303666 A1 | 10/2019 | Summers |
| 2019/0349426 A1 | 11/2019 | Smith et al. |

OTHER PUBLICATIONS

Al-Fuqaha, "Internet of Things: A Survey on Enabling Technologies, Protocol, and Applications", 2015, IEEE, pp. 2347-2372 (Year: 2015).*

Jun. 27, 2022—(US) Non-Final Office Action—U.S. Appl. No. 16/424,633.

Jan. 4, 2023—(US) Final Non-Final Office Action—U.S. Appl. No. 16/424,633.

Benammar, "A Modular IoT Platform for Real-Time Indoor Air Quality Monitoring," Feb. 14, 2018, MDPI, pp. 1-18.

* cited by examiner

| Time | Sensor 1 | ML Algorithm Output | Variance | Processing Code | Prioritization Code |
|---|---|---|---|---|---|
| 12:31:29 | 12.01 | | 12.01 | | |
| 13:31:29 | 12.05 | 12.05 | 0 | 1 | 1 |
| 14:31:29 | 11.99 | 11.88 | 0.11 | 1 | 1 |
| 15:31:29 | 11.82 | 11.8 | 0.02 | 1 | 1 |
| 16:31:29 | 11.06 | 11.68 | -0.62 | 1 | 1 |
| 17:31:29 | 40 | 11.06 | 28.94 | 4 | 2 |
| 18:31:29 | 40 | 11 | 29 | 2 | 4 |
| 19:31:29 | 40 | 10.59 | 29.41 | 2 | 4 |
| 20:31:29 | 40 | 10.52 | 29.48 | 2 | 4 |
| 21:31:29 | 40 | 10.51 | 29.49 | 2 | 4 |
| 22:31:29 | 40 | 10.5 | 29.5 | 2 | 4 |
| 23:31:29 | 6.03 | 10 | -3.97 | 2 | 4 |
| 0:31:29 | | 9.5 | -9.5 | 3 | 3 |
| 1:31:29 | | 9 | -9 | 3 | 3 |

OPTIMIZED IOT DATA PROCESSING FOR REAL-TIME DECISION SUPPORT SYSTEMS

BACKGROUND

Enterprise organizations utilize various computing infrastructure to make decisions and trigger actions. The computing infrastructure may include computer servers, computer networks, and sensors. Such an environment may include the Internet of Things (IoT). Often time, an IoT environment generates a plethora of raw sensor data that can overwhelm an enterprise organization. As a result, decision-making may be hindered, slowed, or cumbersome. The forthcoming disclosure addresses one or more of the aforementioned drawbacks and shortcomings of IoT environments, as well as other features.

SUMMARY

Aspects of the disclosure provide effective, efficient, scalable, and convenient technical solutions that address and overcome the technical problems associated with IoT environments by using one or more features disclosed herein.

In accordance with one or more embodiments, a system of one or more computers may be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a sensor computing system, including a processor and a memory storing computer-readable instructions that, when executed by the processor, cause the system to perform numerous operations. The system may receive sensor data from one or more sensors, and then preprocess the sensor data with a simplified state estimation (SSE) module to calculate a variance. The SSE module may use a machine learning model that was trained using a data set. The system may further generate a processing code for the sensor data based on the variance, and then associate the processing code with the sensor data. The system may also associate a prioritization code with the sensor data. Finally, the system may send the sensor data, the processing code, and the prioritization code to a real-time processing platform. The real-time processing platform processes the sensor data, when the platform is busy, in an order based on at least the prioritization code. Other embodiments of this aspect include corresponding computer systems, apparatus, and computer programs recorded on one or more computer storage devices, each configured to perform the actions of the methods.

One general aspect includes a method with steps to: receive, by a sensor computing system including at least a processor and a memory, sensor data from one or more sensors; preprocess, by a simplified state estimation (SSE) module including a graphics processing unit (GPU) of the sensor computing system, the sensor data to calculate a variance; generate, by the processor of the sensor computing system, a processing code for the sensor data based on the variance; associate, by the processor of the sensor computing system, the processing code with the sensor data; associate, by the processor of the sensor computing system, a prioritization code with the sensor data; and send, by the processor of the sensor computing system, the sensor data, the processing code, and the prioritization code to a real-time processing platform, where the real-time processing platform processes the sensor data, when the platform is busy, in an order based on at least the prioritization code. Other embodiments of this aspect include corresponding computer systems, apparatus, and computer programs recorded on one or more computer storage devices, each configured to perform the actions of the methods.

Implementations may include one or more of the following features. A method where the one or more sensors are arranged in a parking lot of a retail banking location, and the sensor computing system designates the received sensor data for data fusion. The method where the one or more sensors are arranged in an automated teller machine (ATM), and the sensor computing system designates the received sensor data for a processing code corresponding to historical data access. The method where the associate the processing code with the sensor data includes inserting the processing code into a first field in a header of a packet storing the received sensor data. The method may also include where the associate the prioritization code with the sensor data includes inserting the prioritization code into a second field in the header of the packet. The method where latency of the received sensor data is reduced as a result of the preprocessing step. The method where the processing code corresponds to one of: data fusion, remove noise, replace missing data, and historical data access; and where the one or more sensors includes one or more of: an ultrasonic sensor, a camera, a microphone, a pressure sensor, and a passive infrared receiver. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 2 is a table with illustrative values corresponding to various variables described herein in accordance with one or more example embodiments;

DETAILED DESCRIPTION

In one example, apparatuses, method steps, and systems are described here for optimized Internet of Things (IoT) data processing for real-time decision support systems. However, the disclosed solutions are not limited to any specific sensor and may be integrated with one or more IoT systems of different types, including systems that receive sensor measurements but are not typically labeled as IoT systems. In some examples, one or more edge devices in the system may generate processing codes that are used in optimizing the data processing. For example, the optimizing of the data processing may include steps of a data fusion process that uses the generated processing codes (e.g., those generated by the one or more edge devices). Moreover, the systems described herein may be used for real-time processing prioritization using a prioritization code and/or processing code. Edge devices as referenced in this disclosure may comprise a sensor, computer memory, and/or processing elements to perform the operations described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Figure 1A:
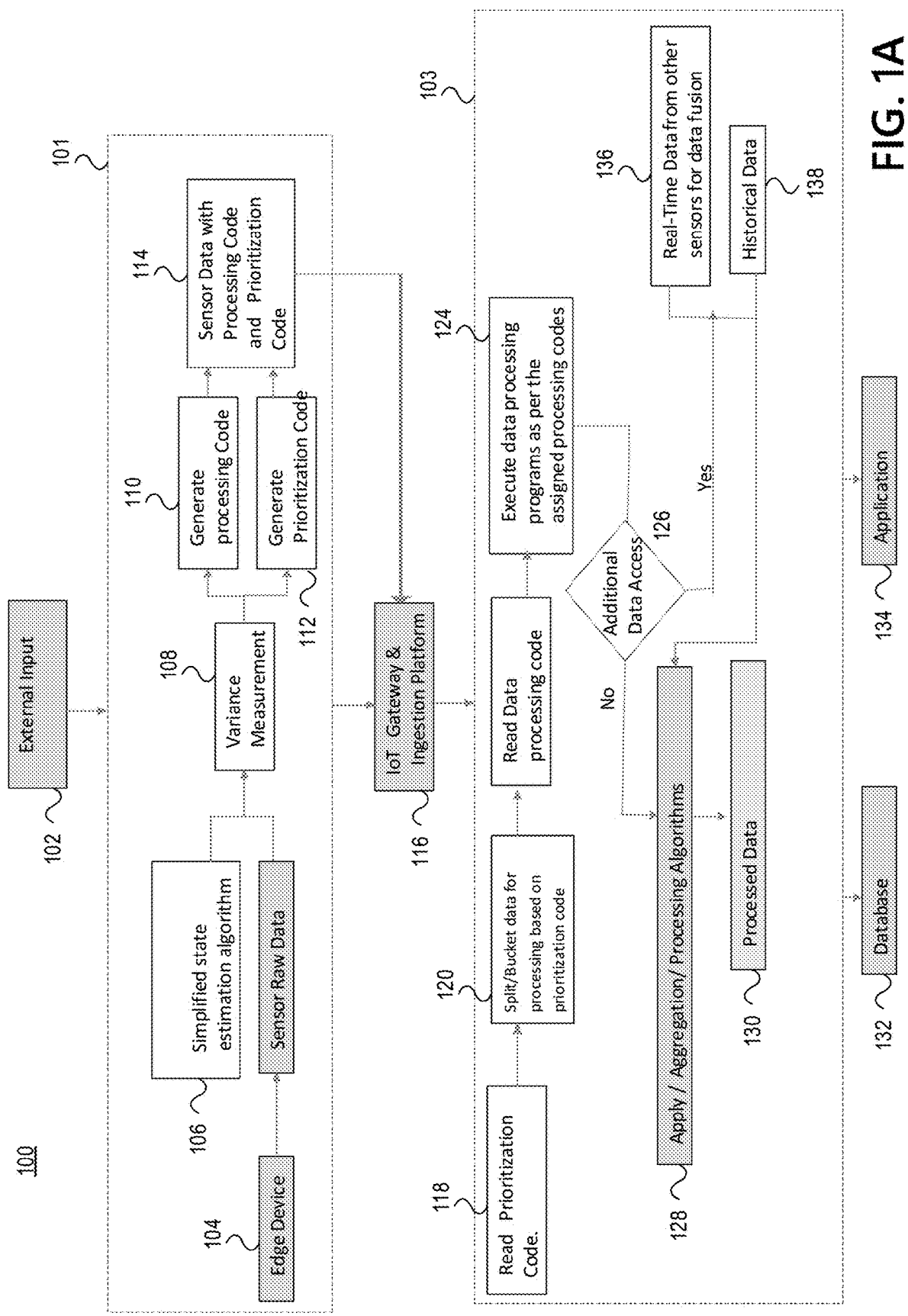
FIG. 1A and FIG. 1B depict illustrative computing environments in accordance with one or more example embodiments.
Figure 1B:
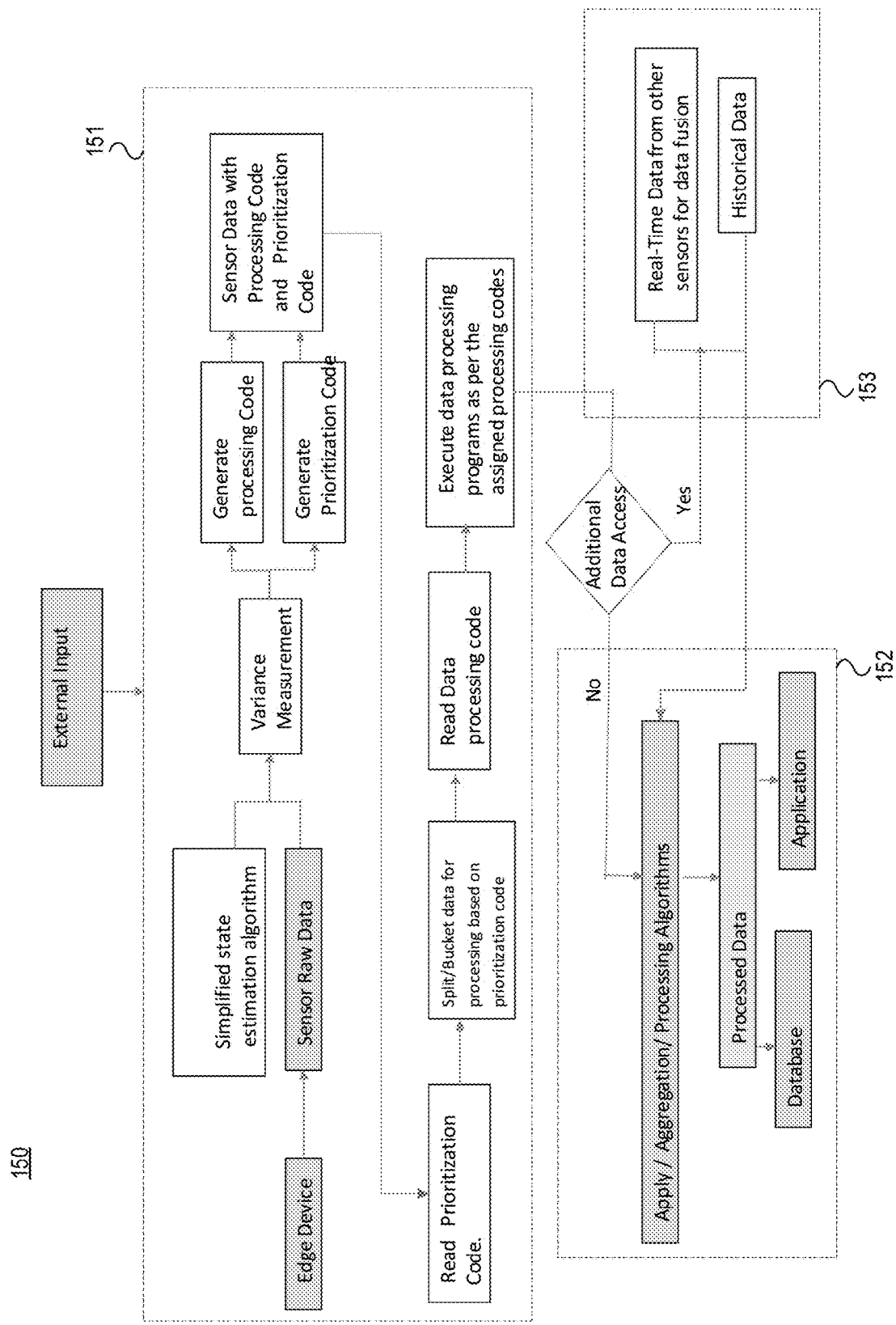

FIG. 1A and FIG. 1B depicts illustrative computing environments 100, 150 for optimized IoT data processing for real-time decision support systems. One general aspect includes a sensor computing system, including a processor and a memory storing computer-readable instructions that, when executed by the processor, cause the sensor computing system to perform numerous operations. For example, the system 100 receives sensor data from one or more sensors 104 and preprocesses the sensor data with a simplified state estimation (SSE) module 106 to calculate a variance (see 108). The SSE module may use a machine learning model trained using a data set. Other embodiments may include corresponding computer systems, apparatus, and computer programs recorded on one or more computer storage devices, each configured to perform the actions of the methods. In one example, the sensor computing system 101 may include a neural network including a graphics processing unit (GPU) configured to calculate a variance using the sensor data and output of the SSE module 106. In another embodiment, the neural network, or comparable other components for performing artificial intelligence, may be located in the SSE module 106 such that the output of the SSE module 106 provides a feedback loop into the SSE module 106. Implementations of the described techniques may include hardware, a method or process, or computer software on a computer-accessible medium. For example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In FIG. 1A, the edge device (e.g., sensor 104) receives external input 102 in the form of pressure, force, electrical stimulus, optical detection, water detection, humidity detection, sound waves, and/or other tangible inputs. Some examples of sensors 104 include, but are not limited to one or more of: an ultrasonic sensor, a camera, a microphone, a pressure sensor, and a passive infrared receiver. The one or more sensors may be communicatively coupled to the processor and memory to assist in collecting sensor data. In one example, the ultrasonic sensor in the system 100 may measure distance and/or detect obstructions in the proximity of the sensor. For example, the ultrasonic sensor may be arranged in a parking lot at a banking center, such as to provide parking reservations for particular customers. In another example, a camera in the system 100 may capture video and/or still images to identify customers and/or other people/objects. The captured video/images may be used for, inter alia, security purposes or other purposes. In yet another example, a microphone in the system 100 may measure sound to capture different sound levels in, inter alia, a banking center or other location. The captured sound may be used to identify customer interactions at the banking center. In another example, a pressure sensor in the system 100 may measure when a force and/or pressure is applied to an object. For example, the measurements from the pressure sensor may be used to determine if a customer is seated or walking away in the event of failure of a camera sensor (e.g., video streaming failure). In yet another example, a passive infrared sensor, or other optical light wave sensor, in the system 100 may detect obstructions in the proximity of the system 100 for, inter alia, security purposes or other purposes. The system 101

Next, the system 101 generates a processing code (see 110) for the sensor data based on the variance measurement 108 and then associates (see 114) the processing code with the sensor data. The system 101 may associate, in one example, the processing code with the sensor data by, inter alia, inserting the processing code into a first field in a header of a packet storing the received sensor data. In another example, the system 101 may store computer-readable instructions in memory, that when executed by the processor, cause the system 101 to insert the processing code into a header of a packet of the received sensor data. As a result of the preprocessing step, the latency of the received sensor data is overall reduced. Thus, the system 100 is better equipped to provide real-time decision-making to the enterprise organization.

In the system 100, examples of processing codes include, but are not limited to, data fusion, remove noise, replace missing data, historical data access, and/or other processing codes. Each processing code may be assigned a unique value as illustrated in the table 200 in FIG. 2, where "data fusion" is assigned to 1, "remove noise" is assigned to 2, "replace missing data" is assigned to 3, and "historical data access" is assigned to 4. FIG. 2 illustrates that at time 13:31:29, an illustrative sensor (i.e., "Sensor 1" 104) receives an output from the SSE module 106 of 12.05 that module 108 compares to the sensor's reading of 12.05 to obtain a variance measurement of 0. Based on the sensor reading and variance calculation, module 110 generates and assigns a processing code of 1 (e.g., data fusion) to the data corresponding to the sensor reading. As the table 200 illustrates, in one example, the variance changes from time 13:31:29 to time 16:31:29 from 0.11 down to −0.62 until at time 17:31:29, the variance spikes to 28.94, thus triggering a change in module 110 to generate a different processing code, as illustrated in FIG. 3.

Figure 3:
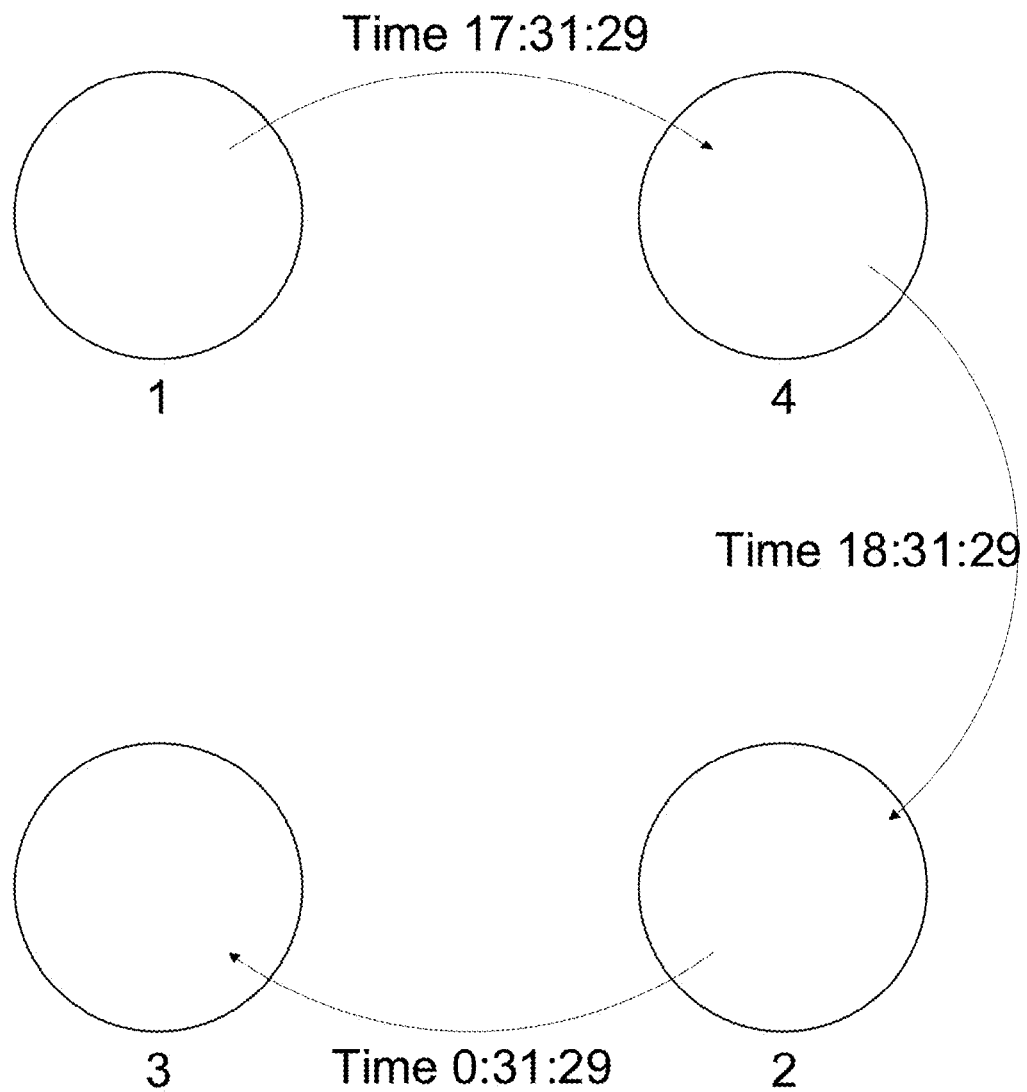
FIG. 3 is a state flow diagram showing a transition from associating one processing code to another processing code at various points in time in accordance with one or more example embodiments.

FIG. 3 is a state diagram illustrating the transition by module 110 from generating a data fusion processing code (e.g., processing code 1 depicted by the circle in the upper-left corner) to generating a historical data access processing code (e.g., processing code 4 depicted by the circle in the upper-right corner) at time 17:31:29. Then at time 18:31:29, the sensor computing system 101 transitions to a remove noise processing code (e.g., processing code 2 depicted by the circle in the lower-right corner). Finally, at time 0:31:29, the sensor computing system 101 transitions to a replace missing data processing code (e.g., processing code 3 depicted by the circle in the lower-left corner). The transition from one processing code to another processing code may be, in one example, triggered by a change in variance between the actual sensor reading and the output of the SSE module 106. The variance value is correlated to the processing code determined, generated, and associated (see 114) with the sensor data output by the sensor computing system 101.

In addition to the processing code, the system 101 may also generate (see 112) a prioritization code with the sensor data. In one example, like the processing code, the prioritization code may also be associated (see 114) with the sensor data output by the sensor computing system 101. The system 101 may associate, in one example, the prioritization code with the sensor data by, inter alia, inserting the prioritization code into a field in a header of a packet storing the received sensor data. This field may be a different field from that which stores the processing code associated with the received sensor data. In another example, the codes may be combined or consolidated into a single field. In another example, the system 101 may store computer-readable instructions in memory, that when executed by the processor, cause the system 101 to insert the prioritization code into a header of a packet of the received sensor data.

In several embodiments, the processing code and the priority code have a one-to-one relationship. In other words, as illustrated in the table 200 of FIG. 2, no two prioritization codes are used for the same processing code and no two processing codes are used for the same prioritization code. In other examples, a one-to-many relationship may exist between prioritization codes and processing codes—for example, a single processing code may be assigned a different prioritization code based on other criteria considered by the sensor computing system 101. In one example, depending on the values of other sensors 104 in the system 100, the prioritization code may be adjusted to increase or decrease the priority by which a receiving system 116, 103 processes incoming sensor data.

After the pre-processing of the sensor data is complete, the sensor computing system 101 sends the sensor data, the processing code, and/or the prioritization code to a real-time processing platform 103. In one example, the real-time processing platform 103, 152 may process the sensor data in an order based on at least the prioritization code. In particular, when the real-time processing platform 103 is busy, a processing unit at the platform 103 may process the sensor data in a prioritization order based on at least the codes associated with the sensor data. The real-time processing platform 103 may first read the prioritization code (see 118) to determine which sensor data to process first when the platform 103 is overloaded with processing requirements. Assuming the platform 103 is busy processing jobs, the incoming sensor data may be split (see 120) into buckets/groupings based on prioritization code and/or processing code. Next, the real-time processing platform 103 may read the processing code and execute (see 124) a program corresponding to the processing code associated with the particular sensor data. For example, for processing code "remove noise," the platform 103 may proceed to execute (see 128) its corresponding program on the incoming sensor data without requiring additional data access (see 126).

In contrast, when additional data access (see 126) is desired, the real-time processing platform 103 may access sensor data from other sensors for data fusion (see 136). In other examples, the platform 103 may access historical data (see 138) for real-time processing of the incoming sensor data. Once a computer processor at the platform 103 executes the program on the sensor data, the processor generates processed data 130 that may be used for one or more purposes. In one example, the processed data may be stored in a database 132 for consideration at a later time when additional data access 126 is desired. In other examples, the processed data 130 may be used in an application 134 to modify the behavior of the application 134. For example, a smartphone application may behave differently if the microphone sensor 104 on the smartphone device detects a loud noise above a certain decibel threshold.

Referring to FIG. 1B, in some examples an IoT gateway device 116 might be omitted in the communicative coupling of the sensory computing system 101 to the real-time processing platform 103. The IoT gateway device 116 may, in some examples, receive sensor data from different sensor systems and translate the received sensor data into a consistent data format for processing by a shared real-time processing platform 103. In contrast, in FIG. 1B, the IoT gateway device 116 is omitted, and instead, the sensor computing system 151 may be communicatively coupled to the real-time processing system 152 without requiring an IoT gateway device 116. In one such example, the incoming sensor data may be homogenous and standardized such that no translation is required by an IoT gateway device 116. Instead, as illustrated in FIG. 1B, the sensor computing system 151 may communicate with an external component 153 to determine if additional data access 126 may be desired. If so, then component 153 may perform one or more functions provided by modules 136, 138 to prepare the sensor data for processing by a real-time processing platform 152 in FIG. 1B. Importantly, the disclosed embodiments are not limited to any specific sensor and may be integrated with one or more IoT systems of different types, including systems that receive sensor measurements but are not typically labeled as IoT systems. In some examples, one or more edge devices in the system may generate processing codes that are used in optimizing the data processing. For example, the optimizing of the data processing may include steps of a data fusion process that uses the generated processing codes (e.g., those generated by the one or more edge devices). Moreover, the systems described herein may be used for real-time processing prioritization using a prioritization code and/or processing code.

For example, in the case where the incoming sensor data is associated with a processing code for data fusion, component 153 accesses real-time sensor data from other sensors to perform data fusion. In one example, two sensors 104 in the system may be a temperature sensor and a humidity sensor arranged in proximity on a system 150. The relationship between temperature and humidity is known to be related in that when temperature rises, humidity typically also rises. As such, a data fusion processing code may be generated by the sensor computing system 151 when a temperature sensor generates a value that the SSE module 106 identifies as having a large variance to the temperature sensor data. As a result, the sensor computing system 151 may preprocess the sensor data to indicate that data fusion is desired between the temperature sensor data and the humidity sensor data. The fusion of the two data will reveal if a sensor has failed or if another problem exists in the system 100. The data fusion may also be used to reduce the amount of sensor data to derive the humidity data from the temperature data. As a result, in one example, data from the humidity sensor may be pre-processed at the sensor computing system 101 and then discarded once validated to comply with the known relationship between temperature and humidity. Then, the temperature sensor data from the system 101 may be sent to the real-time processing platform 103 with a data fusion processing code to indicate that the temperature data has been fused with the pre-processed humidity data at the sensor computing system 101.

Figure 4:
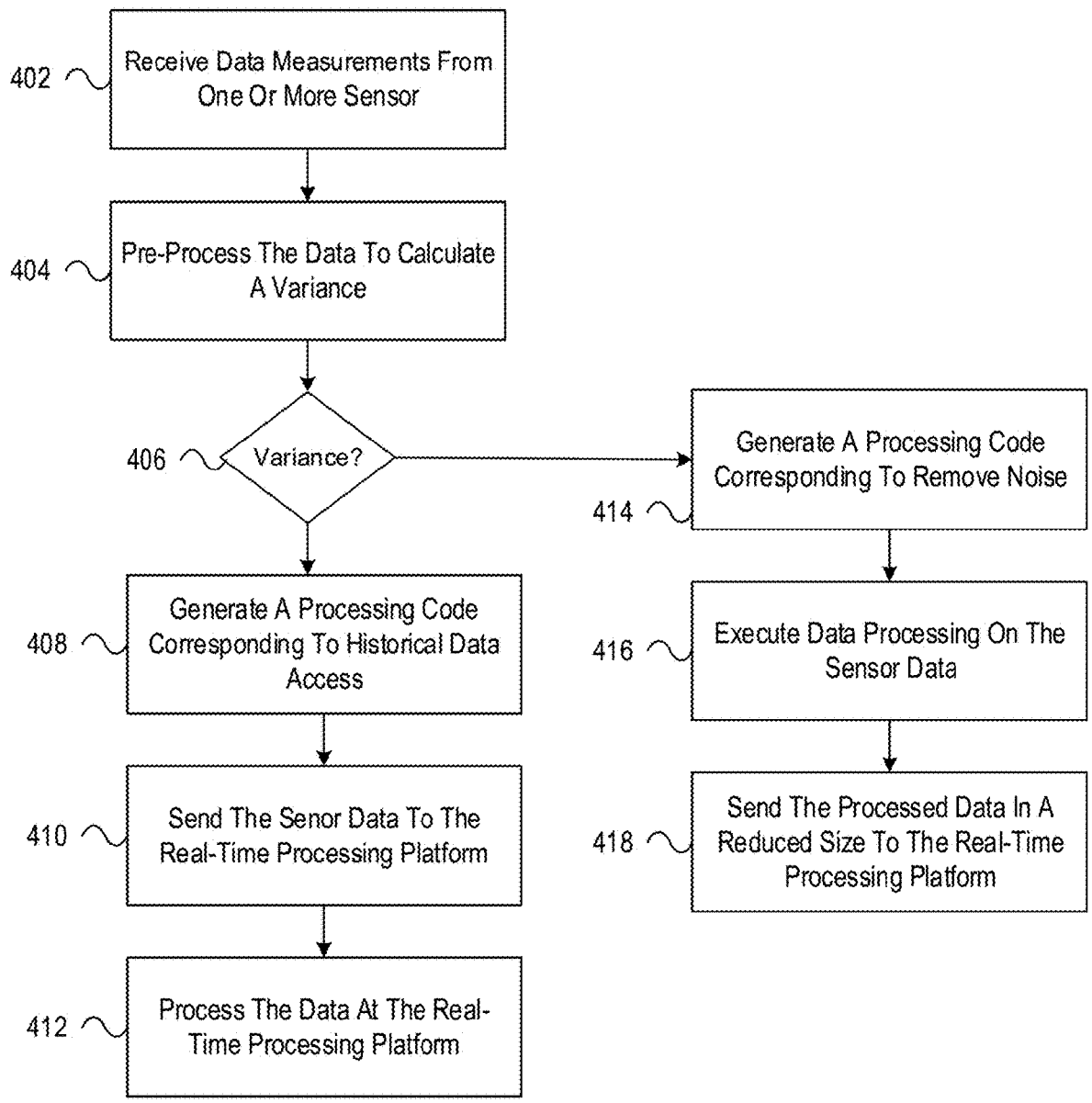
FIG. 4 is a flowchart in accordance with one or more example embodiments.

In another example, referring to the flowchart of FIG. 4, a real-time processing platform may be configured to, in response to the processing code corresponding to historical data access, query a database for historical sensor data sharing characteristics with the received sensor data. In step 402, the sensor computing system 101 may receive data measurements from one or more sensors 104. The system 101 pre-processes, in step 404, the sensor data to calculate a variance to assist in enhancing real-time processing of the sensor data. If the variance indicates, in step 406, that the sensor data may be reduced or enhanced by removing noise, then the as illustrated in FIG. 1B, the remove noise processing code may trigger a program to execute (see step 416) on a processor at the sensor computing system 101. The resulting enhanced sensor data may then be transmitted (see step 418) to a real-time processing platform 152 for applying to a real-time application or storage in a database.

Moreover, referring to FIG. 4, in step 408, the variance (see 406) may result in a historical data access processing code being generated by the sensor computing system 151. As a result, an additional data access may occur at component 153 to query a database for historical sensor data sharing characteristics with the received sensor data. The historical sensor data and the real-time sensor data may be sent (in step 410) to the real-time processing platform 152. At the platform 152 the processing unit at the real-time processing platform processes, in step 412, the data to make a real-time determination that changes the behavior of an application. Alternatively, the real-time determination may result in enhanced data being stored to a database.

Figure 5A:
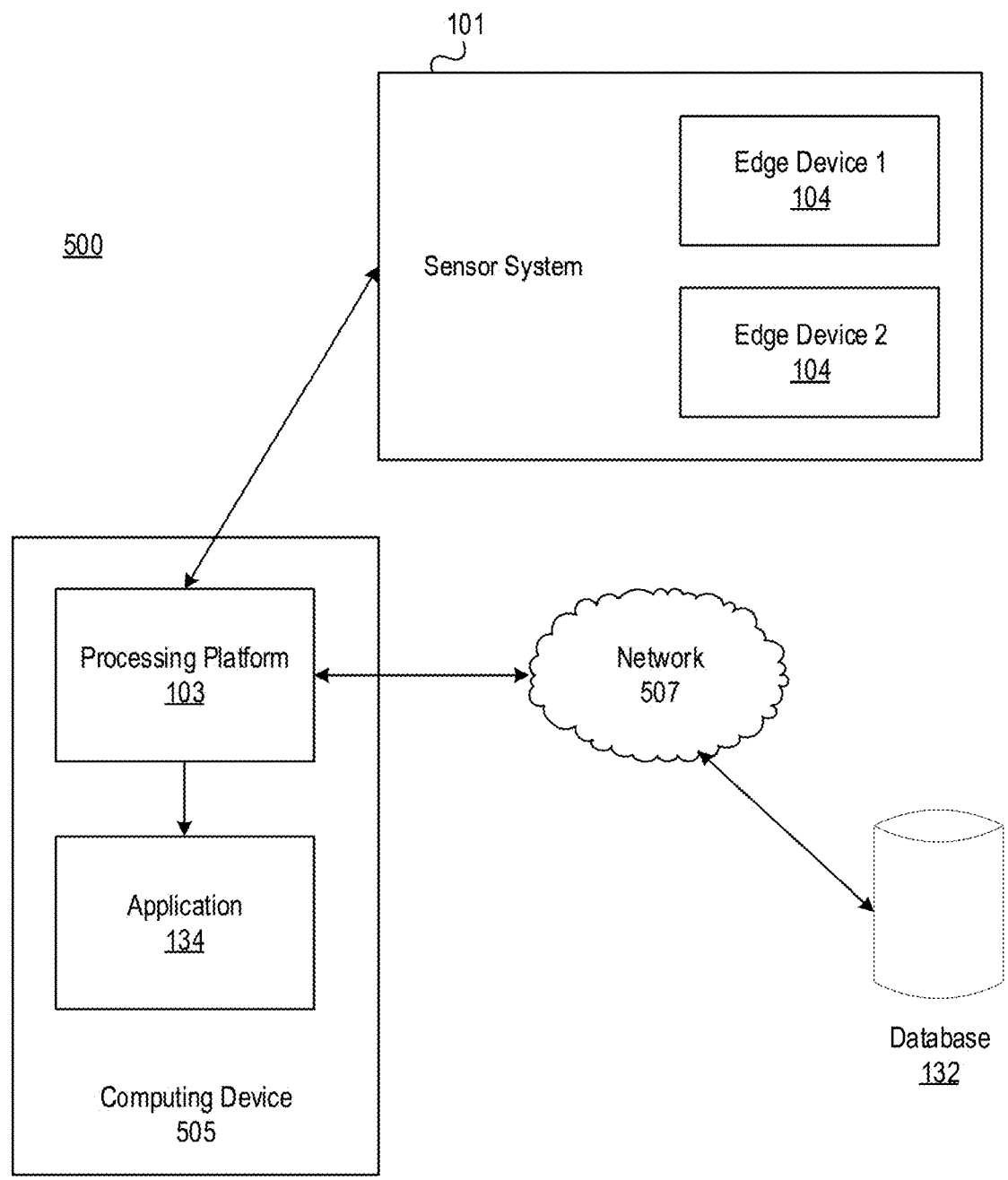
FIG. 5A, FIG. 5B, and FIG. 5C depict illustrative computing environments in accordance with one or more example embodiments.

Referring to FIG. 5A, in one illustrative system 500d, one or more sensors 104 may be arranged in sensor computing system 101 in an automated teller machine (ATM). The sensor 104 may comprise a camera configured to capture video of a user at the automated teller machine. The sensor data may be used for purposes of enhancing security at the automated teller machine in accordance with one or more aspects disclosed herein. For example, the sensor data generated by the camera sensor 104 may be associated with a remove noise processing code to reduce the amount of video data that the sensor computing system 101 transmits to the real-time processing platform 505. In some examples, the computing device 505 may also be in the automated teller machine to enable real-time security decision-making based on the sensor data. The processing platform 103 may operate on the collected sensor data to reduce noise. For example, the noise may include video data outside of the immediate vicinity of the automated teller machine, such as background video. In another example, the remove noise processing code may identify the face of the user of the ATM and discard all other video data outside of the face. The video images of the face may be used by the real-time processing platform 505 to identify an identity of the user, then adjust the behavior of the ATM in real-time to restrict a user's access if a positive identity cannot be determined. Meanwhile, if a different identity is confirmed in real-time, the ATM might take other actions, such as adjusting the sensor recording behavior to collect appropriate information to result in the arrest of the user. The system may be communicatively coupled over a network 507 to a database 132 that stores sensor data and other information desired by the system 500.

Figure 5B:
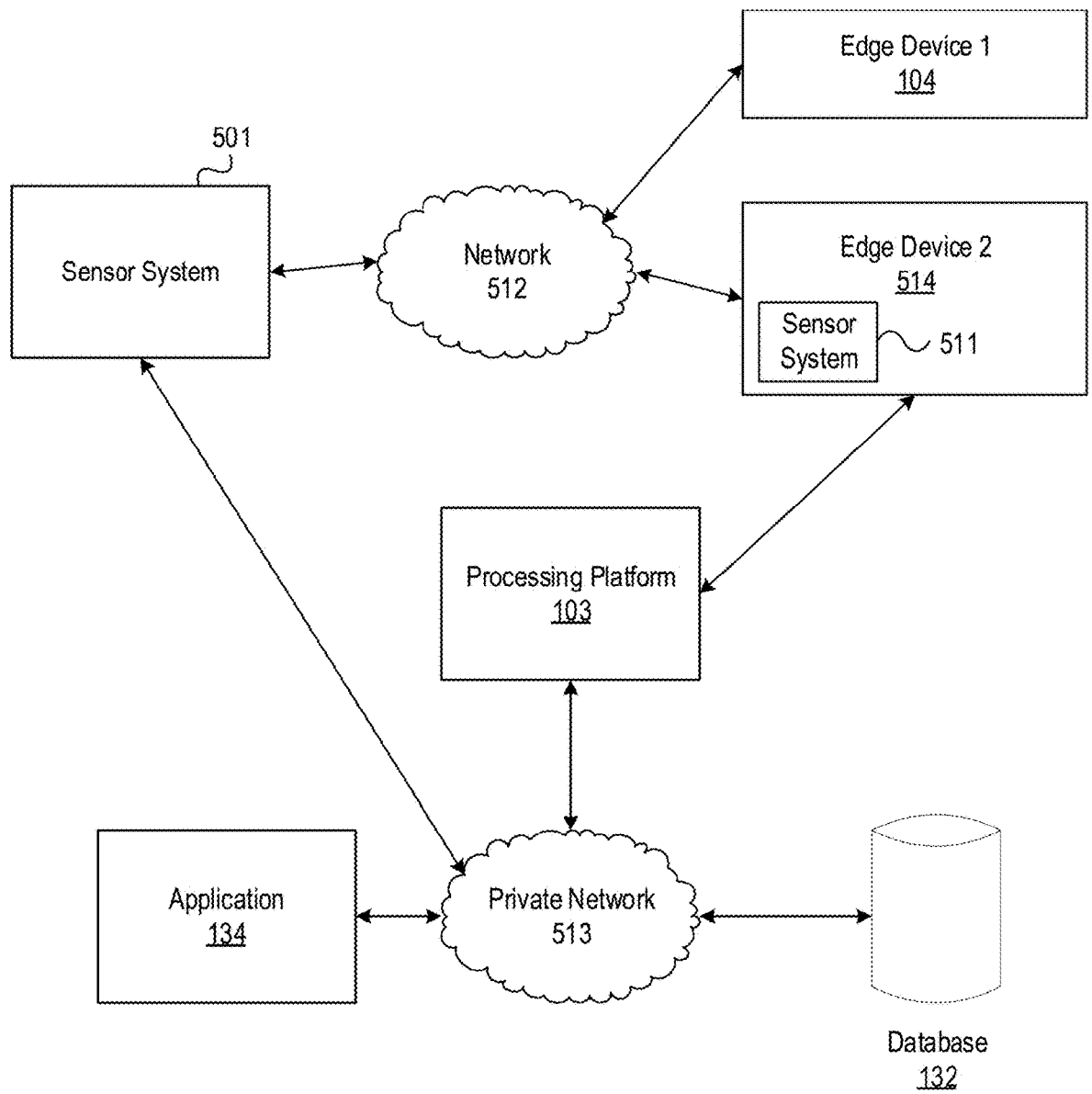

Referring to FIG. 5B, in yet another example, the edge devices 104, 514 may be embodied as stand-alone and separate from a sensor computing system 501, or alternatively as integrated with a sensor computing system 511. In one example, a retail banking center may include one or more sensors arranged in or around a parking lot of a retail banking location. An arrangement of sensors positioned outside of a banking center building may monitor the approach of particular users or other objects. For example, a sensor 104 installed in the ground may detect the weight of a vehicle parked in a particular spot. With a detected vehicle, sensor data may be transmitted over a network 512 to a sensor computing system 501 for preprocessing. The sensor computing system 501 may designate the received sensor data for data fusion by generating an appropriate processing code. When received at a real-time processing platform 103, the data fusion processing code triggers a processor at the platform 103 to analyze and compare the sensor data from multiple sources to detect additional information about the system 510. For example, the system 510 may also include an edge device 514 that comprises a sensor computing system 511 that preprocesses the sensor data using a processing unit at the edge device 514 itself. Moreover, with a data fusion processing code, the sensor data from the device 514 is processed for fusion with other sensor data from device 104. In one example, a video camera 514 at the retail banking center may collect data that is fused by the processing platform 103 with other sensor data, such as from a pressure sensor 104. As a result, the combined, fused data may detect that an unauthorized vehicle has parked in a VIP parking spot at the retail banking center.

Figure 5C:
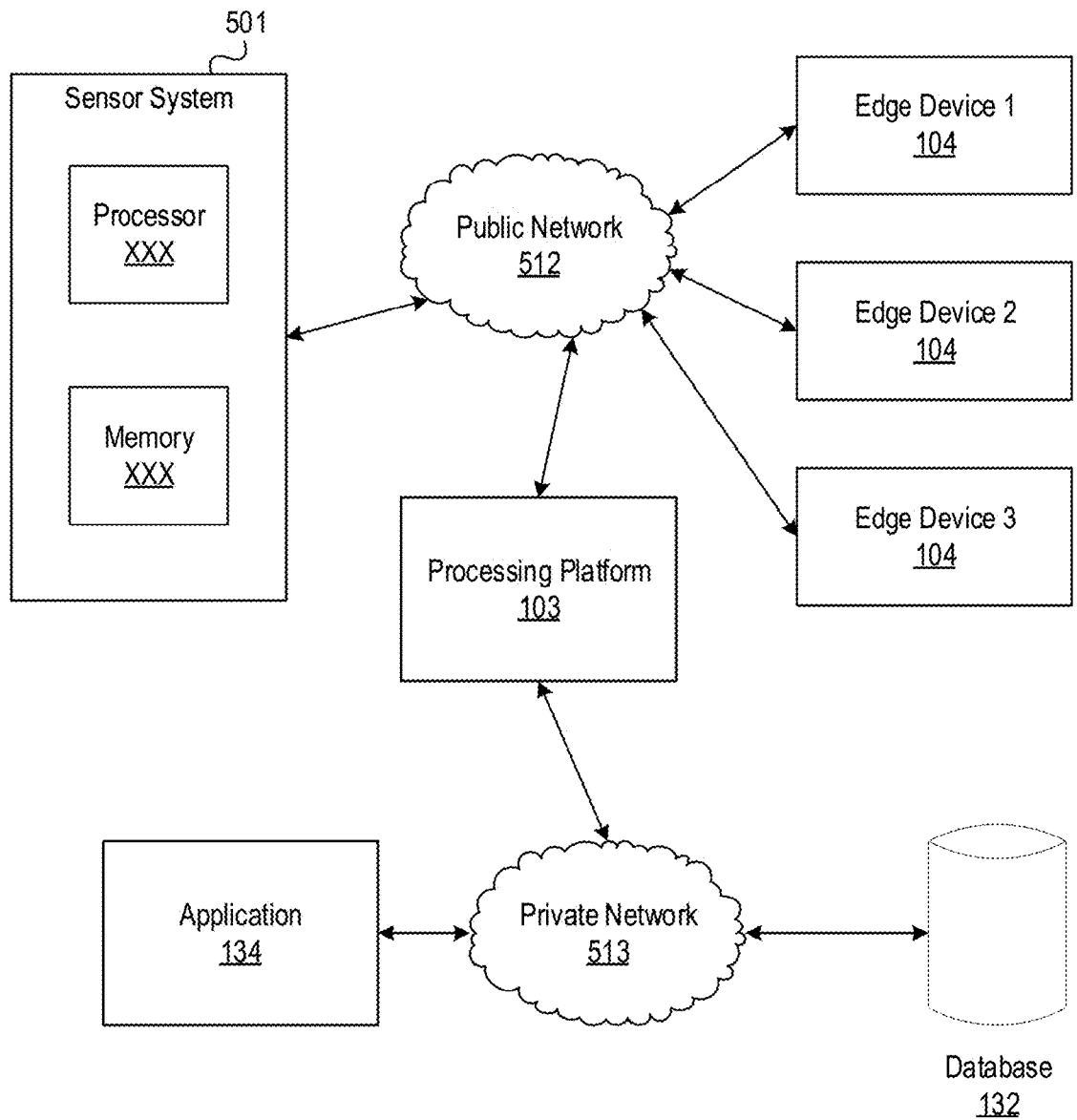

In one example, referring to FIG. 5B, the real-time processing platform may be protected from cyberattacks behind a private network 513. The private network 513 may include one or more firewalls or other security measures to restrict unauthorized access over the private network 513. In some examples, the private network 513 may comprise one or more IoT gateway 116 or other ingestion platforms to receive sensor data or other processed data. Referring to FIG. 5C, system 520 reflects a diagram in which the real-time processing platform 103 is positioned outside of the private network 513 so that one or more sensors 104 can access it and/or the sensor computing system 501 without the overhead of security authorization. Meanwhile, an application 134 and database 132 may be protected behind a private network 513. As such, the processing platform 103 may modify the behavior and operation of the application 134 only over a private, secure network 513. The platforms described in FIG. 5A, FIG. 5B, and FIG. 5C may include one or more computing devices configured to perform one or more of the functions described in this disclosure. For example, the computing platform may include one or more computers (e.g., laptop computers, desktop computers, servers, server blades, or the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A sensor computing system, comprising:
   one or more processors; and
   a memory storing computer-readable instructions that, when executed by the processor, cause the system to:
   receive sensor data from one or more sensors;
   preprocess, by a simplified state estimation (SSE) module comprising a graphics processing unit (GPU) of the sensor computing system, the sensor data to calculate a variance, wherein latency of the received sensor data is reduced;
   generate a processing code for the sensor data based on the variance, wherein the processing code changes based on a change in the variance;
   associate the processing code with the sensor data;
   associate a prioritization code with the sensor data, wherein the processing code and prioritization code have a one-to-one relationship where no two prioritization codes are used for the same processing code and no two processing codes are used for the same prioritization code;
   translate the sensor data by an Internet of Things gateway device into a data format for processing by a real-time processing platform, wherein the Internet of Things gateway device communicatively couples the sensor computing system to the real-time processing platform; and
   send the sensor data, the processing code, and the prioritization code to the real-time processing platform, wherein the real-time processing platform processes the sensor data, when the platform is busy, in an order based on at least the prioritization code and wherein the platform reads the processing code and executes a program corresponding to the processing code.

2. The system of claim 1, further comprising the one or more sensors, wherein the one or more sensors are communicatively coupled to the processor and comprise one or more of:
   an ultrasonic sensor;
   a camera;
   a microphone;
   a pressure sensor; and
   a passive infrared receiver.

3. The system of claim 1, further comprising:
   a neural network comprising a graphics processing unit configured to calculate the variance using the sensor data and an output of the SSE module.

4. The system of claim 1, wherein the SSE module uses a machine learning model trained on a dataset to calculate the variance.

5. The system of claim 1, wherein the processing code corresponds to one of: data fusion, remove noise, replace missing data, and historical data access.

6. The system of claim 5, wherein the one or more sensors are arranged in an automated teller machine, and the sensor computing system designates the received sensor data for a processing code corresponding to historical data access.

7. The system of claim 5, wherein the real-time processing platform is configured to, in response to the processing code corresponding to historical data access, query a database for historical sensor data sharing characteristics with the received sensor data.

8. The system of claim 5, wherein the real-time processing platform is configured to, in response to the processing code corresponding to remove noise, reduce or enhance the sensor data by removing noise.

9. The system of claim 5, wherein the real-time processing platform is configured to, in response to the processing code corresponding to data fusion, receive additional sensor data from the one or more sensors.

10. The system of claim 5, wherein the one or more sensors are arranged in a parking lot of a retail banking location, and the sensor computing system designates the received sensor data for data fusion.

11. The system of claim 1, wherein associate the processing code with the sensor data comprises inserting the processing code into a first field in a header of a packet storing the received sensor data, and wherein associate the prioritization code with the sensor data comprises inserting the prioritization code into a second field in the header of the packet.

12. A method comprising:
- receive, by a sensor computing system comprising at least a processor and a memory, sensor data from one or more sensors;
- preprocess, by a machine learning model trained on a dataset, the sensor data to calculate a variance;
- generate, by the processor of the sensor computing system, a processing code for the sensor data based on the variance, wherein the processing code changes based on a change in the variance;
- associate, by the processor of the sensor computing system, the processing code with the sensor data;
- associate, by the processor of the sensor computing system, a prioritization code with the sensor data, wherein the processing code and prioritization code have a one-to-one relationship where no two prioritization codes are used for the same processing code and no two processing codes are used for the same prioritization code;
- translate the sensor data by an Internet of Things gateway device into a data format for processing by a real-time processing platform, wherein the Internet of Things gateway device communicatively couples the sensor computing system to the real-time processing platform; and
- send the sensor data, the processing code, and the prioritization code to a real-time processing platform, wherein the real-time processing platform processes the sensor data, when the platform is busy, in an order based on at least the prioritization code and wherein the platform reads the processing code and executes a program corresponding to the processing code.

13. The method of claim 12, wherein the one or more sensors comprises one or more of: an ultrasonic sensor, a camera, a microphone, a pressure sensor, and a passive infrared receiver.

14. The method of claim 12, wherein associate the processing code with the sensor data comprises inserting the processing code into a first field in a header of a packet storing the received sensor data; and
wherein associate the prioritization code with the sensor data comprises inserting the prioritization code into a second field in the header of the packet.

15. The method of claim 12, wherein the processing code corresponds to one of: data fusion, remove noise, replace missing data, and historical data access.

16. The method of claim 15, wherein the real-time processing platform is configured to, in response to the processing code corresponding to historical data access, query a database for historical sensor data sharing characteristics with the received sensor data.

17. The method of claim 15, wherein the real-time processing platform is configured to, in response to the processing code corresponding to remove noise, reduce or enhance the sensor data by removing noise.

18. The method of claim 15, wherein the real-time processing platform is configured to, in response to the processing code corresponding to data fusion, receive additional sensor data from the one or more sensors.

19. One or more non-transitory computer-readable media storing instructions that, when executed by a sensor computing system comprising at least one processor and memory, cause the sensor computing system to:
- receive sensor data from one or more sensors;
- preprocess, by a simplified state estimation (SSE) module comprising a graphics processing unit (GPU), the sensor data to calculate a variance;
- generate a processing code for the sensor data based on the variance, wherein the processing code changes based on a change in the variance;
- associate the processing code with the sensor data;
- associate a prioritization code with the sensor data; wherein the processing code and prioritization code have a one-to-one relationship where no two prioritization codes are used for the same processing code and no two processing codes are used for the same prioritization code;
- translate the sensor data by an Internet of Things gateway device into a data format for processing by a real-time processing platform, wherein the Internet of Things gateway device communicatively couples the sensor computing system to the real-time processing platform; and
- send the sensor data, the processing code, and the prioritization code to a real-time processing platform, wherein the real-time processing platform processes the sensor data, when the platform is busy, in an order based on at least the prioritization code and wherein the platform reads the processing code and executes a program corresponding to the processing code, and
- wherein latency of the received sensor data is reduced after execution of the instructions stored in the non-transitory computer-readable media of the sensor computing system.

20. The one or more non-transitory computer-readable media of claim 19, wherein the processing code corresponds to one of: data fusion, remove noise, replace missing data, and historical data access.

* * * * *